(12) United States Patent
Kobayashi

(10) Patent No.: US 6,567,851 B1
(45) Date of Patent: May 20, 2003

(54) MULTICAST-SESSION-MANAGEMENT DEVICE

(75) Inventor: Naofumi Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/362,798

(22) Filed: Jul. 28, 1999

(30) Foreign Application Priority Data

Feb. 19, 1999 (JP) .......................................... 11-041786

(51) Int. Cl.[7] .............................................. G06F 15/16
(52) U.S. Cl. ........................ 709/228; 709/203; 709/231; 709/223; 709/238; 709/245; 709/220; 370/312; 370/388; 370/390
(58) Field of Search ................................ 709/231, 223, 709/228, 203, 238, 245, 220; 370/312, 388, 390

(56) References Cited

U.S. PATENT DOCUMENTS

| | | | | | |
|---|---|---|---|---|---|
| 5,612,959 | A | * | 3/1997 | Takase et al. | 370/390 |
| 5,786,771 | A | * | 7/1998 | Feeney et al. | 370/388 |
| 5,999,530 | A | * | 12/1999 | LeMaire et al. | 370/390 |
| 6,018,771 | A | * | 1/2000 | Hayden | 709/231 |
| 6,041,166 | A | * | 3/2000 | Hart et al. | 709/220 |
| 6,046,989 | A | * | 4/2000 | Takahashi | 370/312 |
| 6,138,144 | A | * | 10/2000 | DeSimone et al. | 370/260 |
| 6,181,697 | B1 | * | 1/2001 | Nurenberg et al. | 370/390 |
| 6,223,286 | B1 | * | 4/2001 | Hashimoto | 713/178 |
| 6,259,701 | B1 | * | 7/2001 | Shur et al. | 370/401 |

FOREIGN PATENT DOCUMENTS

| | | |
|---|---|---|
| JP | 9-64900 | 3/1997 |
| JP | 9-116592 | 5/1997 |

* cited by examiner

*Primary Examiner*—Ayaz Sheikh
*Assistant Examiner*—Thu Ha Nguyen
(74) *Attorney, Agent, or Firm*—Katten Muchin Zavis Rosenman

(57) ABSTRACT

A device for multicast-session management provided in a network including one or more servers and a plurality of clients includes a data-exchange interface which receives an original data flow from a server, and multicasts a multicast data flow to the network, a usable-multicast-address-registration unit which stores therein usable multicast addresses, and a destination-address-conversion unit which converts a destination address of the original data flow into a multicast address, the multicast address being selected from the usable multicast addresses stored in said usable-multicast-address-registration unit, wherein said data-exchange interface multicasts the original data flow having the multicast address as the multicast data flow.

16 Claims, 6 Drawing Sheets

|  | MULTICAST ADDRESS | SERVER ADDRESS | DATA RATE |
|---|---|---|---|
| SESSION1 | 239.0.13.124 | 133.161.139.2 | 1.5Mbps |
| SESSION2 | 239.12.0.11 | 133.161.138.23 | 960kbps |
| SESSION3 | 239.1.24.138 | 133.162.64.15 | 78kbps |
| SESSION4 | 239.12.1.22 | 133.166.192.7 | 1.5Mbps |

FIG.6

|  | SERVER ADDRESS | TRANSMISSION TIMING | MULTICAST ADDRESS |
|---|---|---|---|
| SERVER1 | 133.161.139.2 | REAL TIME | ANY |
| SERVER2 | 133.161.138.23 | ACCUMULATION/ TRANSMISSION AT X HOUR Y MINUTE | FIXED/239.12.0.11 |
| SERVER3 | 133.162.64.15 | REAL TIME | ANY |
| SERVER4 | 133.163.192.7 | TRANSMISSION AFTER ACCUMULATION | FIXED/239.12.1.22 |
| SERVER5 | 133.162.92.54 | ACCUMULATION/ TRANSMISSION AT X HOUR Y MINUTE | FIXED/239.12.0.14 |

MULTICAST-SESSION-MANAGEMENT DEVICE

BACKGROUND OF THE INVENTION

1. Field of the Invention

The present invention generally relates to multicast-session-control devices used in a network which is comprised of servers for transmitting flow of data such as multimedia data, clients for receiving a multicast data flow, and network-transit devices such as routers adapted for multicast transmission. Such multicast-session-control devices are used for controlling allocation of multicast addresses, for example.

In recent years, intra-organization information-system networks (intranets) have become widely used due to a significant market progress of personal computers, and, also, networks which connect computers together have been experiencing a significant enhancement in their functions and performance.

As use of intranets and the Internet increases, transmission of multimedia data such as moving pictures and audio data is increased. Against this background, there is a demand for technologies that make possible an efficient transfer of large size data. In order to achieve this objective, efficient use of multicast transmission is regarded as a viable solution.

The present invention particularly relates to a multicast-session-control device used in a network such as an intranet for the purpose of achieving an efficient multicast transmission where the network is equipped with multicast-adapted network elements that permit use of multicast transmission.

2. Description of the Related Art

A multicast technology makes it possible to transmit data to a group of communication devices selected from communication devices connected to a network such as the Internet or an intranet. Multicast is different from broadcast which transmits data to all the communication devices connected to the network in that multicast transmits data only to a selected group of communication devices.

In the following, a description will be given with regard to a multicast technology that employs an IP multicast based on internet protocols, and is implemented via the Ethernet serving as transfer media.

IP multicast uses IP multicast addresses which are defined by an address system that is called a class D in the IP address system. By attaching an IP multicast address to transmission data, the IP multicast attends to simultaneous transmission directed to a plurality of destinations.

Figure 7A:
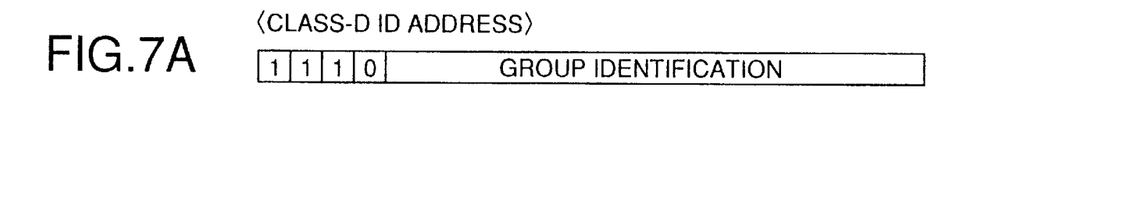
FIGS. 7A through 7C are illustrative drawings for explaining multicast addresses.
Figure 7B:
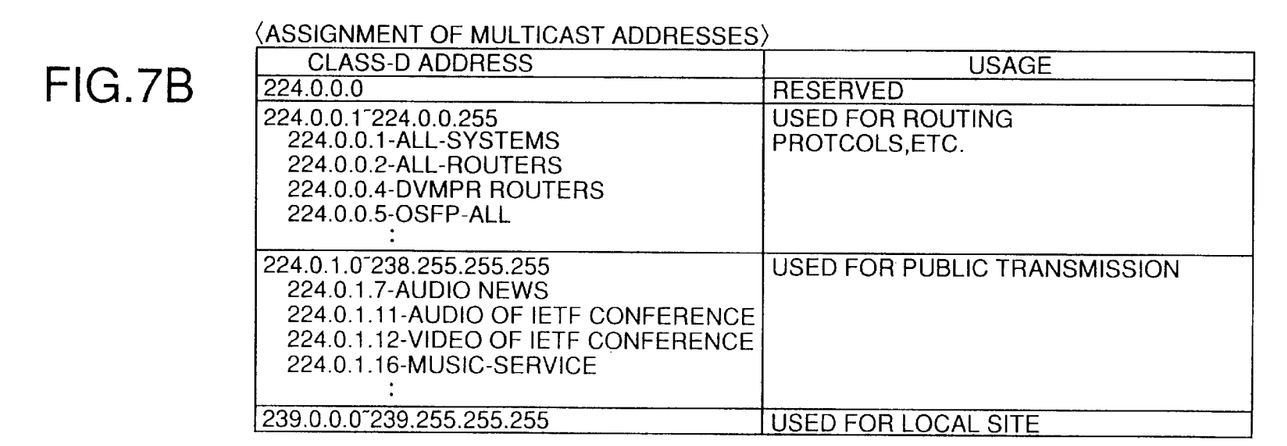
Figure 7C:
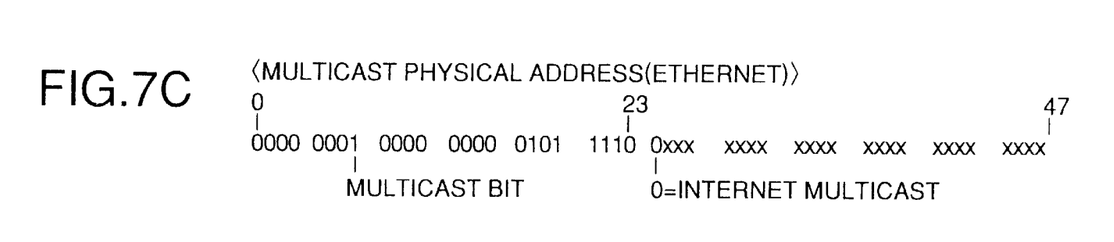

FIGS. 7A through 7C are illustrative drawings for explaining multicast addresses.

FIG. 7A shows a class-D IP-address system, and FIG. 7B shows allocation of IP multicast addresses. FIG. 7C demonstrates a multicast physical address used in the Ethernet.

As shown in FIG. 7A, a class-D IP address is an IP address that has four upper bits thereof set to "1110". These four upper bits are used for identifying a given address as an IP multicast address. The remaining bits of the IP multicast address are used for indicating a multicast group.

The class-D IP address covers an address range from 224.0.0.0 to 239.255.255.255 based on decimal representation. Some IP multicast addresses within this range are reserved for special use.

As shown in FIG. 7B, an IP address of 224.0.0.0 is reserved, and is not assignable, and IP addresses from 224.0.0.1 to 224.0.0.255 are assigned for routing-protocol purposes. Further, IP addresses from 224.0.1.0 to 238.255.255.255 are assigned for public media services.

Only the remaining IP addresses from 239.0.0.0 to 239.255.255.255 are available for local sites, and can be used as addresses for intranets or the like.

Conversion from an IP multicast address to a multicast physical address is defined in the Request For Comments 1700, which is published by IETF (Internet Engineering Task Force) that sets forth internet standards.

According to this definition, conversion from a class-D IP address to a physical address is performed by inserting 23 lower bits of the class-D IP address into 23 lower bits of a multicast physical address "01.00.5E.00.00.00(HEX)".

For example, an IP multicast address "239.133.130.34" is converted into a multicast physical address "01:00:5E:05:82:22(HEX)".

When multimedia data or the like is to be transmitted as multicast, a server for multicast transmission selects a usable IP multicast address, and transmits data after attaching the selected IP multicast address to the data flow. In the field of this technological art, however, there is no established procedure or method for selecting an IP multicast address.

Namely, an IP multicast address to be used is either arbitrarily selected by each server or determined by a server administrator or the like after the server administrator inquires a network administrator about usable IP multicast addresses. Here, the network administrator is in charge of assignment of IP multicast addresses.

Further, a client for receiving multimedia data via multicast transmission needs to register in multicast-adapted network-transit devices (i.e., routers) in order to arrange receipt of transmitted multimedia data. To achieve this, a client needs to report an IP multicast address of multimedia data that the client wishes to receive.

Namely, a client has to register an IP multicast address of desired multimedia data so as to join a corresponding IP-multicast group. Information about what multimedia data are available at what IP multicast addresses is announced to a client via E-mail or by posting the information on an electronic bulletin board. Such arrangement for informing clients is made by a server administrator through a manual procedure.

As described above, there is no established procedure for automatically assigning a usable multicast address to a multicast data flow without making duplicate use of the same multicast address. This makes it troublesome to select a usable multicast address, and may end up using the same multicast address for different multicast transmissions.

In order to avoid duplicate use of the same multicast address in a network comprised of a plurality of servers, a multicast address used by a given server needs to be announced to all the other servers that may conduct multicast transmission of their own. Such a process leads to an increase of a data processing burden on the servers and an increase in the traffic load on the network.

Further, since guide information about the multicast multimedia data and/or the introduction thereof need to be announced via E-mail or electronic bulletin boards by server administrators thorough a manual procedure, a process of announcement takes time and labor. In this manner, handling of multimedia-data transmission via a multicast operation is quite burdensome.

Inconvenience in multicast-session management such as allocation of multicast addresses as described above has been one of the factors that prevent the multicast transmission technology to be widely used despite the fact that the multicast technology is effective in transmitting large-size multimedia data such as moving pictures to a large number of clients.

Accordingly, there is a need for a multicast-session-management device which can select a usable multicast address while avoiding duplicate use of the same address as that used by another server so as to achieve easier multicast-session management, and can allow easier use of multicast services by transmitting to clients guide information about multimedia data such as moving pictures and audio data.

SUMMARY OF THE INVENTION

Accordingly, it is a general object of the present invention to provide a multicast-session management device which can satisfy the need described above.

It is another and more specific object of the present invention to provide a multicast-session-management device which can select a usable multicast address while avoiding duplicate use of the same address as that used by another server so as to achieve easier multicast-session management, and can allow easier use of multicast services by transmitting to clients guide information about multimedia data such as moving pictures and audio data.

In order to achieve the above objects according to the present invention, a device for multicast-session management provided in a network including one or more servers and a plurality of clients includes a data-exchange interface which receives an original data flow from a server, and multicasts a multicast data flow to the network, a usable-multicast-address-registration unit which stores therein usable multicast addresses, and a destination-address-conversion unit which converts a destination address of the original data flow into a multicast address, the multicast address being selected from the usable multicast addresses stored in said usable-multicast-address-registration unit, wherein said data-exchange interface multicasts the original data flow having the multicast address as the multicast data flow.

In the device described above, the device for multicast-session management is provided for one or more servers, and attends to centralized control of usable multicast addresses. This simplifies a process performed by each server for transmitting multicast data, and makes it easier to control multicast addresses and multicast sessions.

Moreover, the device as described above further includes a multicast-session-information-registration unit which stores therein multicast-session information including information on the multicast address selected from said usable-multicast-address-registration unit, wherein the multicast-session information is multicast to the clients by using a guide-purpose multicast address.

Further, the device as described above is such that said data-exchange interface transmits first control data to the network, and receives second control data from the network, the first control data indicating a status of use of the multicast address and the second control data indicating a status of use of another multicast address used by another device for multicast-session management provided in the network, wherein the multicast addresses stored in said usable-multicast-address-registration unit are updated according to the status of use of said another multicast address.

The device described above communicates with another device for multicast-session management so as to take into account a status of use of a multicast address used by said another device. This configuration securely avoids duplicate use of the same address. Further, the device multicasts the multicast-session information to the clients as guide information about multicast sessions. The clients can thus enjoy increased convenience in use of the multicast transmission.

Other objects and further features of the present invention will be apparent from the following detailed description when read in conjunction with the accompanying drawings.

DESCRIPTION OF THE PREFERRED EMBODIMENTS

In the following, a principle and embodiments of the present invention will be described with reference to the accompanying drawings.

Figure 1:
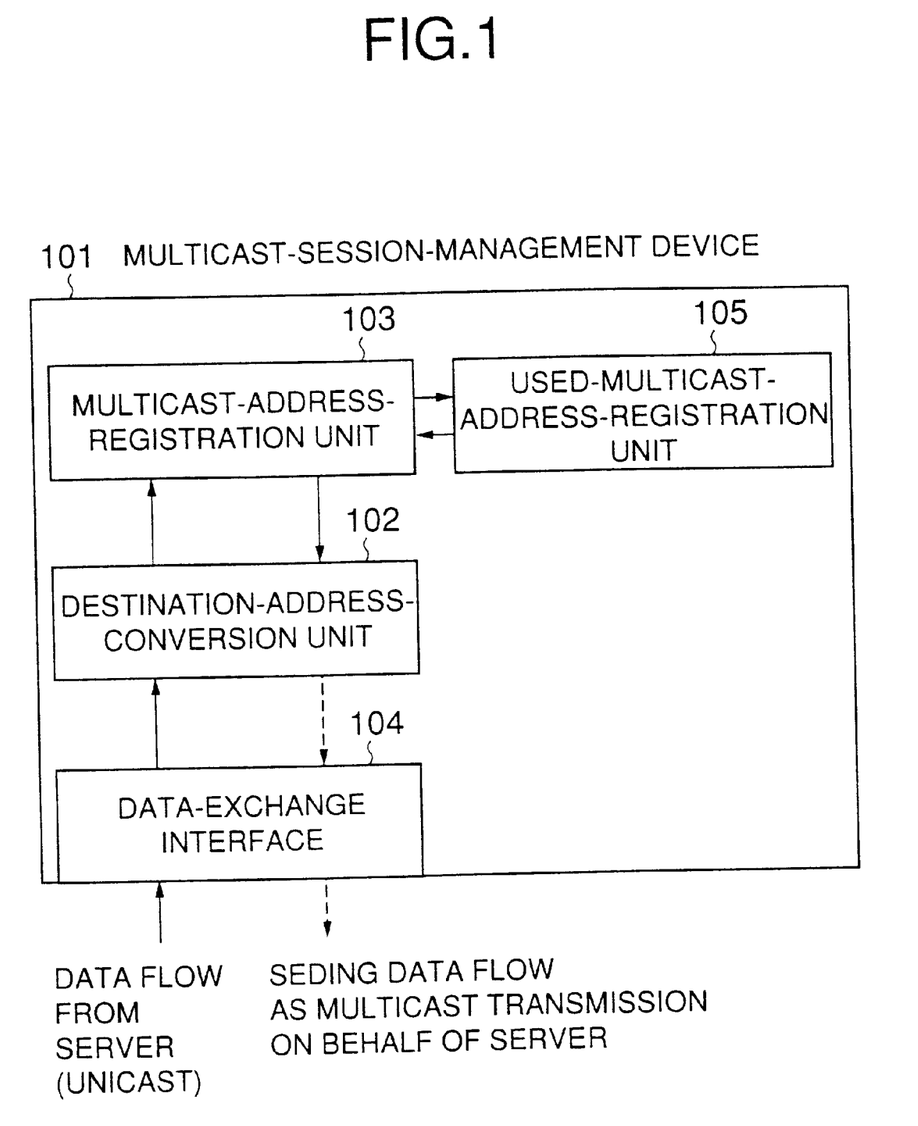
FIG. 1 is a block diagram showing a basic configuration of a multicast-session-management device according to a principle of the present invention.

FIG. 1 is a block diagram showing a basic configuration of a multicast-session-management device according to a principle of the present invention.

In FIG. 1, a multicast-session-management device 101 includes a destination-address-conversion unit 102, a multicast-address-registration unit 103, a data-exchange interface 104, and a used-multicast-address-registration unit 105.

The data-exchange interface 104 of the multicast-session-management device 101 receives a data flow to be transmitted as multicast when a server sends the data flow to the multicast-session-management device 101 as unicast. The destination-address-conversion unit 102 of the multicast-session-management device 101 changes a destination address of the data flow to a multicast address. The data-exchange interface 104 then transmits the data flow with the multicast address attached thereto.

The multicast-session-management device 101 attends to multicast transmission of the data flow on behalf of the server. In doing so, the multicast-session-management device 101 selects a multicast address from usable multicast addresses registered in the multicast-address-registration unit 103 such that the selected multicast address is different from those registered in the used-multicast-address-registration unit 105. The selected multicast address is then registered in the used-multicast-address-registration unit 105. This insures that the same multicast address is not used for a different data flow.

Figure 2:
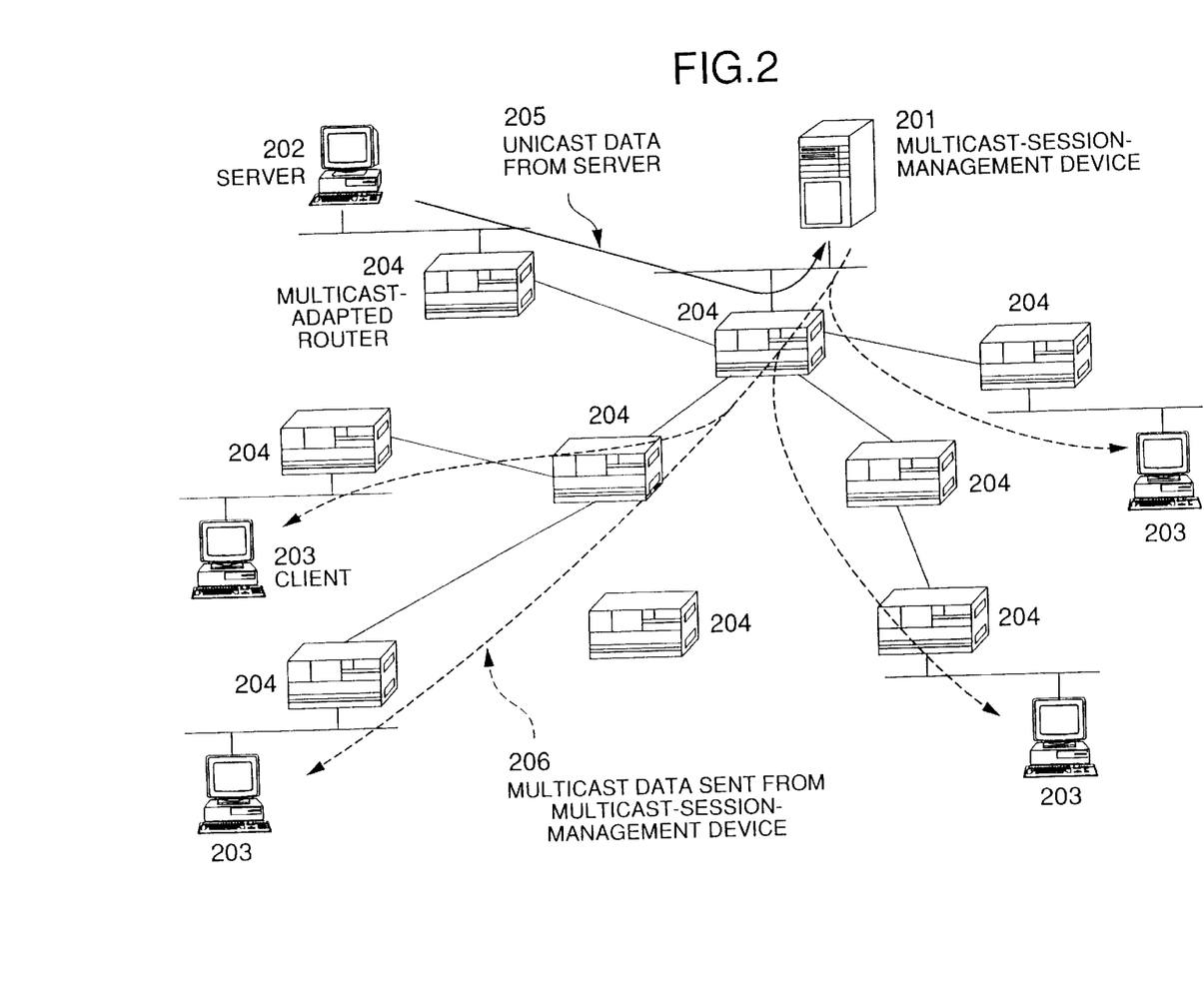
FIG. 2 is an illustrative drawing for explaining a network to which the multicast-session-management device of the present invention is applied.

FIG. 2 is an illustrative drawing for explaining a network to which the multicast-session-management device of the present invention is applied.

In FIG. 2, a network includes a multicast-session-management device 201, a server 202 which transmits a data flow to be multicast, clients 203 which receive the multicast data flow, and multicast-adapted routers 204.

In FIG. 2 the server 202 transmits a data flow 205 for multicast transmission to the multicast-session-management device 201 by using a unicast function, as indicated by a thick solid arrow. The multicast-session-management device 201 changes a destination address of the received unicast data to a multicast address, and multicasts the multicast data flow 206 as indicated by thick dotted arrows on behalf of the server 202.

The multicast data flow transmitted from the multicast-session-management device 201 is delivered by the multicast-adapted routers 204 to the clients 203 that belong to the relevant multicast group.

Here, the multicast-session-management device 201 may be implemented as a separate device as shown in FIG. 2, or may be provided as a built-in function in a network communication device such as a workstation, personal computer, or a router.

Figure 3:
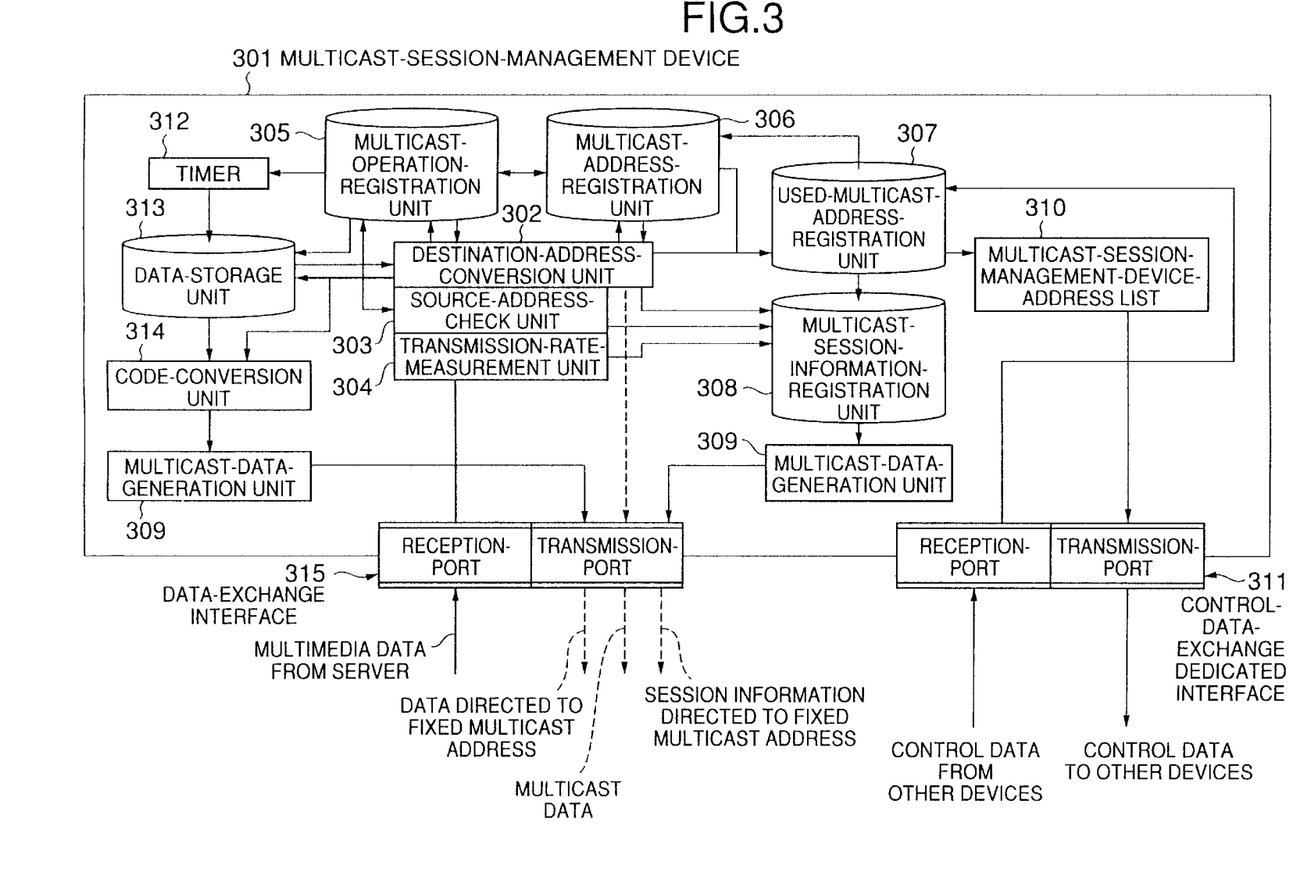
FIG. 3 is a block diagram of functional blocks provided in a multicast-session-management device according to an embodiment of the present invention.

FIG. 3 is a block diagram of functional blocks provided in a multicast-session-management device according to an embodiment of the present invention.

In FIG. 3, a multicast-session-management device 301 includes a destination-address-conversion unit 302, a source-address-check unit 303, a transmission-rate-measurement unit 304, a multicast-operation-registration unit 305, a multicast-address-registration unit 306, a used-multicast-address-registration unit 307, a multicast-session-information-registration unit 308, a multicast-data-generation unit 309, a multicast-session-management-device-address list 310, a control-data-exchange dedicated interface 311, a timer 312, a data-storage unit 313, a code-conversion unit 314, and a data-exchange interface 315.

A server to transmit multicast data sends a data flow for multicast transmission to the multicast-session-management device 301 as unicast data.

The multicast-session-management device 301 receives the data flow from the server via a receiver port of the data-exchange interface 315. The multicast-session-management device 301 selects a multicast address different from any one of the used multicast addresses by searching through usable multicast addresses registered in the multicast-address-registration unit 306. The destination-address-conversion unit 302 replaces a destination address of each packet of the received data flow with the selected multicast address, and transmits these packets as multicast data via a transmission port of the data-exchange interface 315.

In this manner, the multicast-session-management device attends to centralized control of the usable multicast addresses for a plurality of servers. This configuration eliminates a need for each server to make an inquiry about a usable multicast address. A server is thus free from additional burdens other than transmitting a data flow for multicast transmission to the multicast-session-management device as unicast data. This simplifies a data-flow transmission process performed by a server when multicast data transmission is intended, and makes it easier to use multicast transmission.

When a multicast address is selected from the usable multicast addresses stored in the multicast-address-registration unit 306, the selected multicast address is removed from the multicast-address-registration unit 306, and is newly registered in the used-multicast-address-registration unit 307. This process is performed in order to avoid duplicate use of the same multicast address.

After the multicast transmission by the multicast-session-management device 301 comes to an end, he multicast address used in the multicast ransmission is deleted from the used-multicast-address-registration unit 307, and is registered again in the multicast-address-registration unit 306. This makes the multicast address available for future use.

In order to select a usable multicast address from the multicast addresses stored in the multicast-address-registration unit 306 without leading to duplicate use of the same address, the selected multicast addresses may be indicated as being in use by attaching a flag or the like in the multicast-address-registration unit 306 rather than simply deleting the selected multicast address from the multicast-address-registration unit 306.

The multicast-session-management device 301 registers information about multicast addresses of the used-multicast-address-registration unit 307 in the multicast-session-information-registration unit 308. This information is multicast as multicast-session information by using a predetermined multicast address for the guide purpose. Such a predetermined multicast address is set in the multicast-data-generation unit 309.

This configuration allows clients to receive the multicast-session information transmitted by using the guide-purpose multicast address as long as the clients are informed of the guide-purpose multicast address. In this manner, the clients can obtain the session information informing of multicast addresses that are currently in service.

If there is a multicast session that a user wishes to receive, the user may request registration for joining a multicast group of this session. The user thereafter receives requested multicast data.

As described above, the multicast-session-information-registration unit 308 stores the used multicast addresses that were selected from the multicast-address-registration unit 306. In addition, the multicast-session-information-registration unit 308 stores a source-server address indicating a server that sent a data flow using a given multicast address, a transmission rate of the data flow, etc., with respect to each multicast session.

Figure 5:
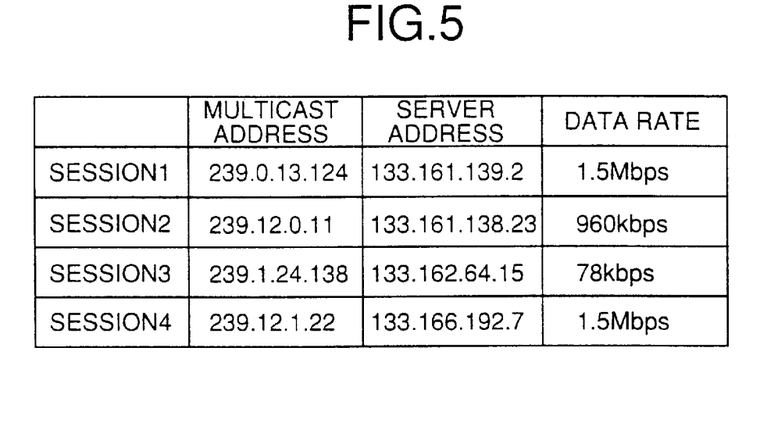
FIG. 5 is a drawing showing an example of a data structure of multicast-session information.

FIG. 5 is a drawing showing an example of a data structure of the multicast-session information.

A source-server address registered in the multicast-session-information-registration unit 308 is obtained by the source-address-check unit 303 when a multicast address is assigned to a data flow. A transmission rate of the data flow is measured by the transmission-rate-measurement unit 304. These two items are registered together with the assigned multicast address in the multicast-session-information-registration unit 308.

Clients receive the multicast-session information including server addresses, transmission data rates, and multicast addresses when the information is transmitted by using the guide-purpose multicast address. A user of a client makes a decision about whether to receive a multicast session by judging the contents of the multicast data flow based on the server address of the data flow, for example. The user may decide not to receive a multicast session if a transmission rate of this multicast session is too large. Since a multicast address is reported to the user, the user can immediately proceed with a registration process for joining a desired multicast group.

The code-conversion unit 314 converts a data flow to a data stream having a lower transmission rate while the multicast-session-management device 301 is transmitting the corresponding multicast data flow. Then, the multicast-session-management device 301 sends the data stream by using the guide-purpose multicast address set in the multicast-data-generation unit 309.

Clients receive the data stream having the lower transmission rate as it is transmitted via the guide-purpose multicast address. If the data flow being multicast at present is comprised of moving pictures, for example, the clients may check the contents of the data stream by taking a look at the moving pictures presented at a lower frame rate, for example, and make a decision as to whether to receive the data flow of the multicast session.

The multicast data transmitted via the guide-purpose multicast address may be accompanied by the multicast-session information including multicast addresses that are currently in use. The clients thus need to know only the guide-purpose multicast address, and can decide whether to join a multicast group of particular interest after checking part of the contents of transmission.

When the destination-address-conversion unit 302 changes a destination address of each packet of a data flow for multicast transmission, address conversion may be performed in real time each time a packet of the data flow arrives. Multicast transmission based on this configuration can achieve implementation of a multicast session almost with no time delay compared to when the server itself attends to the multicast transmission.

Where a data size of a data flow from a server is small, and, thus, only a little time is required before completing the data receipt, the data flow sent from the server is temporarily stored in the data-storage unit 313, and is subjected to address conversion after a predetermined time period so as to be transmitted as multicast. Such an operation may also be performed when multicast transmission does not have to be conducted with no delay or when the multicast-session-management device is not required of a real-time capacity. This configuration can achieve multicast communication that is flexible in coping with a capacity of the multicast-session-management device and/or the load on network communication lines.

Address conversion may be conducted to transmit a multicast data flow after the data-storage unit 313 accumulates all the data flow. Alternately, address conversion and multicast transmission may be attended to with respect to an accumulated portion of the data flow while the data flow is accumulated in the data-storage unit 313.

The timer 312 of the multicast-session-management device 301 may be used for conducting multicast transmission at a predetermined time or at an end of a predetermined time period.

When multimedia data is scheduled to be multicast at the same time everyday, for example, the data flow of the multimedia data is stored in the data-storage unit 313 in advance. The timer 312 goes off to signal the time of multicast, so that the multimedia data can be multicast everyday at the same indicated time.

The source-address-check unit 303 checks a sever address of a source of a data flow, and consults the multicast-operation-registration unit 305 in order to obtain a multicast-transmission operation registered for the server. This makes it possible to perform different multicast-transmission operations for different servers.

There are several different multicast-transmission operations. A data flow may be processed in real time to be multicast, or may be temporarily accumulated before being multicast. Further, control of a transmission time may be involved such that a data flow may be multicast at a predetermined time or at an end of a predetermined time. An arbitrary multicast address may be selected, or a dedicated and fixed multicast address may be selected, giving multicast-transmission operations an aspect of multicast-address-selection control. Further, multicast operations as described above may be combined as appropriate.

The multicast-operation-registration unit 305 stores a multicast-transmission-operation type with respect to each server. The multicast-session-management device 301 then attends to multicast transmission according to a multicast-transmission-operation type registered for a given server by accessing it based on the server address.

Figure 6:
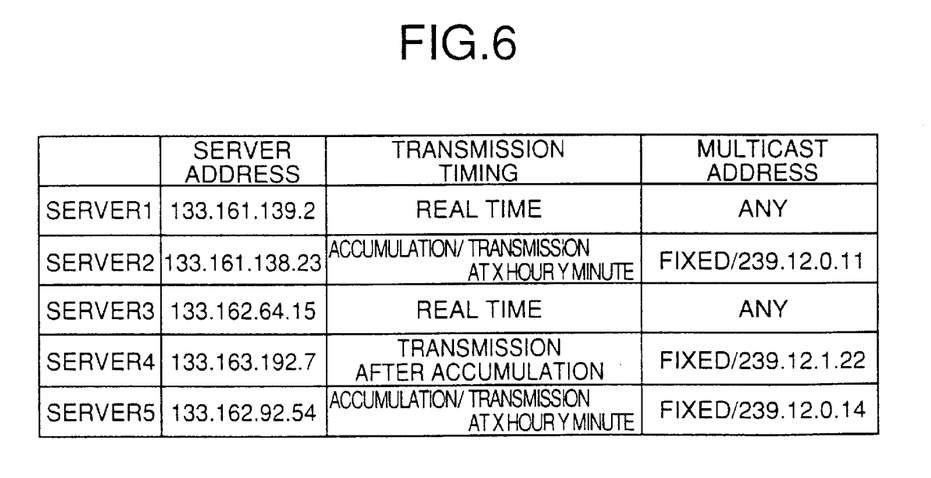
FIG. 6 is a drawing showing an example of a data configuration of data stored in a multicast-operation-registration unit.

FIG. 6 is a drawing showing an example of a data configuration of data stored in the multicast-operation-registration unit 305.

As shown in FIG. 6, the multicast-operation-registration unit 305 provides data fields for a server address, a transmission timing, and a multicast-address selection with respect to each of servers 1 through 5.

When a data flow (multicast session) needs to be multicast everyday at a predetermined time, and a predetermined server is assigned as a source of the data flow as it is the case for the servers 2 and 5 shown in FIG. 6, the multicast-operation-registration unit 305 stores a fixed multicast address that is dedicated for use by a respective one of these servers.

The multicast-session-management device 301 uses the source-address-check unit 303 to check a server address of a source of a data flow when the data flow is received from the server. The multicast-operation-registration unit 305 is then referred to. If a fixed multicast address dedicated to this server is stored in the multicast-operation-registration unit 305, the data flow is multicast via the fixed multicast address dedicated to this server.

This configuration insures that a multimedia data flow for periodic transmission is always sent by using the same multicast address. Multicast-session management is thus made easier, and so is receipt of multicast data by clients.

Figure 4:
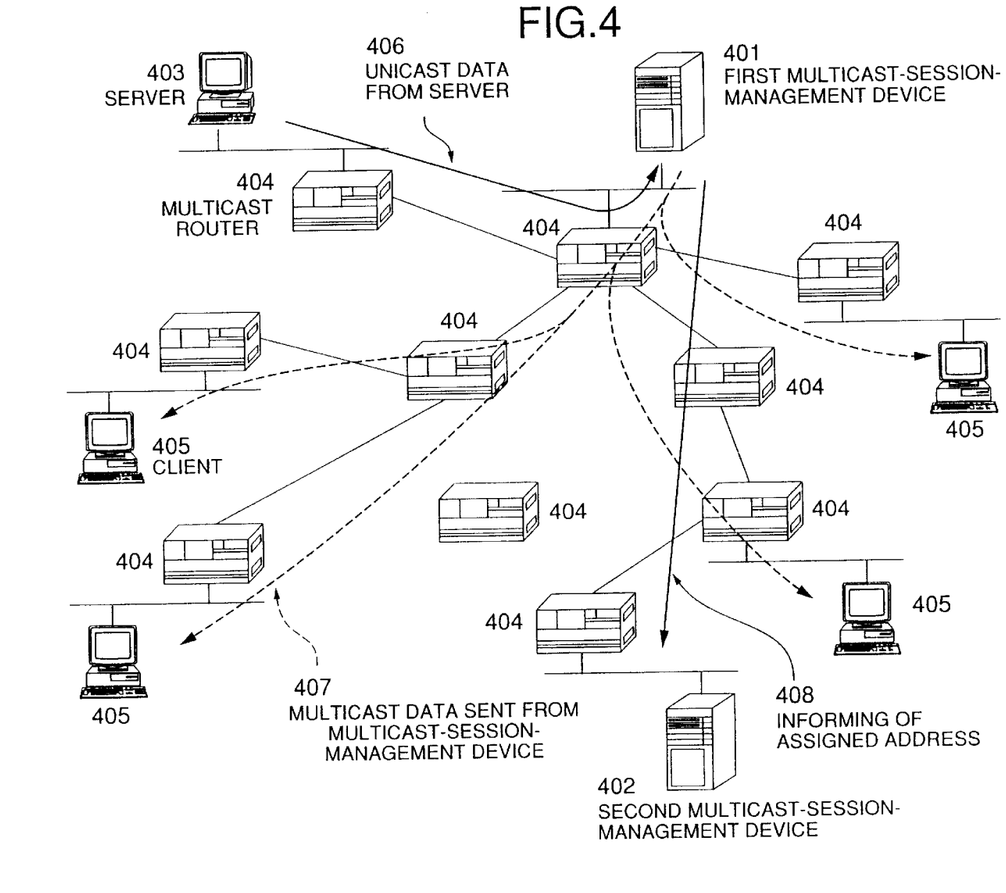
FIG. 4 is an illustrative drawing showing a network configuration in which a plurality of multicast-session-management devices are employed according to another embodiment of the present invention.

FIG. 4 is an illustrative drawing showing a network configuration in which a plurality of multicast-session-management devices are employed according to another embodiment of the present invention.

The network of FIG. 4 includes a first multicast-session-management device 401, a second multicast-session-management device 402, a server 403 for transmitting a data flow for multicast transmission, multicast routers 404, and clients 405 for receiving multicast data.

Each of the first multicast-session-management device 401 and the second multicast-session-management device 402 is provided so as to cover a network segment smaller than a predetermined network size.

When only one multicast-session-management device is provided in the entire network, the multicast-session-management device receives all the multicast data from the servers connected to the network. This results in a traffic congestion in a network area around the multicast-session-management device. Further, the multicast-session-management device has to bear a large processing load, which may results in overloading.

In consideration of this, each multicast-session-management device is installed at such a location as to cover a network segment that is smaller than a predetermined network size. Such a network segment may be defined according to the way an organization is divided into departments and divisions. The multicast-session-management device controls multicast sessions only within its own network segment. Further, multicast-session-management devices collaborate with each other in order to make sure that a multicast address is not used in a duplicate fashion.

In an example of FIG. 4, the server 403 transmits a data flow 406 for multicast transmission to the first multicast-session-management device 401 as unicast data as shown by a thick solid arrow. The first multicast-session-management device 401 transmits the data flow 407 as multicast on behalf of the server 403 as shown by thick dotted arrows.

At the same time, the first multicast-session-management device 401 transmits control data 408 to the second multicast-session-management device 402 as shown by a thick solid arrow. The control data includes information indicative of a used status of a multicast address or an end-of-use status of a multicast address.

After receiving the control data, the second multicast-session-management device 402 attends to such control of multicast addresses as to avoid use of the used multicast address that is assigned by the first multicast-session-management device 401.

The operations described above will be described with reference to FIG. 3.

When a multicast address is assigned to a data flow received from the server by the multicast-session-management device 301, this multicast address is removed from the multicast-address-registration unit 306, and is newly registered in the used-multicast-address-registration unit 307. Also, the multicast-session-management device 301 transmits information indicative of a used status of this multicast address to a multicast-session-management device having an address thereof registered in the multicast-session-management-device-address list 310.

On the other end of the transmission, the multicast-session-management device 301 which received the information indicative of a used status of the multicast address removes the indicated multicast address from the multicast-address-registration unit 306, and, also, stores it in the used-multicast-address-registration unit 307. By doing so, the multicast-session-management device 301 can avoid duplicate use of the same address for another multicast session.

When a large number of multicast-session-management devices are provided in a network, a multicast-session-management device needs to send the same information to as many destinations as there are other multicast-session-management devices. In such a case, the multicast-session-management devices may not be able to update their used multicast-address information in real time by including a received multicast address. This may result in duplicate use of the same address.

In order to avoid such a situation, all the multicast-session-management devices are required to join a predetermined multicast group in advance. By using a multicast address of this group, control data is transmitted in a multicast fashion, so that all the multicast-session-management devices can receive almost simultaneously the control data such as information indicative of a used status of a multicast address. This makes it possible to update multicast-address information at the same time at all the locations.

When a multicast session transmitted from the multicast-session-management device 301 comes to an end, and, thus, a multicast address of this multicast session is no longer used, information indicative an end-of-use status of this multicast address is transmitted to other multicast-session-management devices.

On each of the other ends of the transmission, the multicast-session-management device 301 which received the information indicative of an end-of-use status of the multicast address removes the multicast address from the used-multicast-address-registration unit 307. Further, the multicast-session-management device 301 registers the multicast address again in the multicast-address-registration unit 306, thereby making the multicast address available for subsequent use.

For the purpose of transmitting the information indicative of an end-of-use status of the multicast address, the predetermined multicast address may be used in the same manner as in the transmission of information indicative of a used status of the multicast address. All the multicast-session-management devices (except the one that is transmitting the information) can be thus informed of the newly available multicast address almost simultaneously, so that updating of the multicast-address information is performed at the same time at all the locations.

In the configuration described above, control data that includes information indicative of a used status of a multicast address and an end-of-use status of a multicast address is exchanged between the multicast-session-management devices. When receiving data from the network, therefore, the multicast-session-management device 301 must be able to discriminate control data sent from another multicast-session-management device from a multimedia data flow sent from a server.

To this end, the multicast-session-management device 301 is provided with two separate data-exchange interfaces, and each interface has a respective MAC (media access control) address and a respective IP address. One is the control-data-exchange dedicated interface 311, and the other is the data-exchange interface 315.

In the multicast-session-management device 301, an address of the control-data-exchange dedicated interface 311 of each of the other multicast-session-management devices is stored in the multicast-session-management-device-address list 310. When there is a need to transmit control data such as information of a used status of a multicast address, addresses of the control-data-exchange dedicated interfaces 311 registered in the multicast-session-management-device-address list 310 are used for the purpose of transmission. This allows the control data to be easily discriminated from multimedia data that is transmitted from servers.

Each server keeps an address of the data-exchange interface 315 of the multicast-session-management device 301 that each server uses for multicast transmission. Each server sends a data flow for multicast transmission to this corresponding address.

In the configuration described above, two interfaces are provided in order to discriminate control data received via the network from a data flow received from a server. Alternately, only one interface may be provided, and the source-address-check unit 303 may check a source address of received data. If the source address is one of those registered in the multicast-session-management-device-address list 310, the received data is ascertained as control data sent from another multicast-session-management device 301. This achieves successful discrimination between the data flow from a server and control data from a multicast-session-management device.

As described above, when a plurality of multicast-session-management devices are provided, the multicast-session-management devices exchange newly-used-multicast-address information and newly-available-multicast-address information, thereby avoiding duplicate use of the same multicast address. Alternately, different multicast-session-management devices may be provided with the multicast-address-registration unit 306 that stores multicast addresses falling within different ranges. That is, each multicast-session-management device uses a different set of multicast addresses. This configuration insures that a multicast address assigned by a given multicast-session-management device can never be the same as that assigned by another multicast-session-management device.

In such a configuration, each multicast-session-management device attends to multicast transmission by using a multicast address that can never be used by another multicast-session-management device. This eliminates a need for control data such as newly-used-multicast address information and newly-available-multicast-address information to be exchanged between multicast-session-management devices.

According to the present invention, as described above, a multicast-session-management device is provided for one or more servers, and attends to centralized control of usable multicast addresses. This simplifies a process performed by a server for transmitting multicast data, and makes it easier to control multicast addresses and multicast sessions.

Further, the configuration of the present invention securely avoids duplicate use of the same address, and can transmit guide information about multicast sessions to clients. These clients can thus enjoy increased convenience in use of the multicast transmission.

Moreover, a plurality of multicast-session-management devices may be provided in a network, and collaborate with each other by exchanging control data regarding usable-multicast-address information. This makes it possible to distribute traffic and the load of multicast-session management. Also, good expandability of the network in terms of size thereof is insured.

Further, the present invention is not limited to these embodiments, but various variations and modifications may be made without departing from the scope of the present invention.

The present application is based on Japanese priority application No. 11-041786 filed on Feb. 19, 1999, with the Japanese Patent Office, the entire contents of which are hereby incorporated by reference.

What is claimed is:

1. A device for multicast-session management provided in a network including one or more servers and a plurality of clients, comprising:
   a data-exchange interface which receives an original data flow from a server, and multicasts a multicast data flow to the network;
   a usable-multicast-address-registration unit which stores therein usable multicast addresses;
   a destination-address-conversion unit which converts a destination address of the original data flow into a multicast address, the multicast address being selected from the usable multicast addresses stored in said usable-multicast-address-registration unit, wherein said data-exchange interface multicasts the original data flow having the multicast address as the multicast data flow; and
   wherein the usable multicast addresses stored in said usable-multicast-address-registration unit fall within a multicast-address range assigned to the device, the multicast-address range being different from a multicast-address range assigned to any other devices for multicast-session management provided in the network.

2. The device as claimed in claim 1, further comprising a used-multicast-address-registration unit which stores therein used multicast addresses, wherein the multicast address selected from said usable-multicast-address-registration unit is registered upon the selection thereof in said used-multicast-address-registration unit, and is removed upon an end of use thereof from said used-multicast-address-registration unit.

3. The device as claimed in claim 2, wherein the multicast address selected from said usable-multicast-address-registration unit is removed upon the selection thereof from said usable-multicast-address-registration unit, and is registered again upon the end of use thereof in said usable-multicast-address-registration unit.

4. The device as claimed in claim 1, further comprising a multicast-session-information-registration unit which stores therein multicast-session information that includes information on the multicast address selected from said usable-multicast-address-registration unit, wherein the multicast-session information is multicast to the clients by using a guide-purpose multicast address.

5. The device as claimed in claim 4, wherein said multicast-session-information-registration unit stores therein the multicast-session information with respect to each of different multicast sessions, the multicast-session information with respect to a multicast session of said multicast data flow including said multicast address, a server address of said server, and a transmission rate of said multicast data flow, wherein the multicast-session information with respect to each of different multicast sessions is multicast to the clients by using the guide-purpose multicast address.

6. The device as claimed in claim 4, further comprising a code-conversion unit which converts the original data flow received from the server into a data stream having a transmission rate lower than that of the multicast data flow, wherein the data stream is multicast to the clients by using a guide-purpose multicast address.

7. The device as claimed in claim 1, wherein said destination-address-conversion unit converts in real time a destination address of each packet of the original data flow received from the server into the multicast address each time a packet of the original data flow is received from the server.

8. The device as claimed in claim 1, further comprising a data-storage unit which temporarily stores therein the original data flow received from the server before the destination address thereof is converted into the multicast address and the original data flow having the multicast address is multicast as the multicast data flow.

9. The device as claimed in claim 8, further comprising a timer, wherein the original data flow stored in said data-storage unit is multicast as the multicast data flow at such a time as determined by said timer after the destination address of the original data flow stored in said data-storage unit is converted into the multicast address.

10. The device as claimed in claim 1, further comprising:
    a source-address-check unit which detects a server address of the server from the original data flow received from the server; and
    a multicast-operation-registration unit which stores therein multicast-operation information defining details of a multicast-transmission operation on a server-address-wise basis, wherein multicast transmission of the multicast data flow is performed in accordance with the multicast-operation information about the server that is obtained from said multicast-operation-registration unit by using the server address.

11. The device as claimed in claim 1, further comprising:

a source-address-check unit which detects a server address of the server from the original data flow received from the server; and a multicast-operation-registration unit which stores therein dedicated multicast addresses on a server-address-wise basis for use by specific servers, wherein transmission of the multicast data flow utilizes a dedicated multicast address of the server that is obtained from said multicast-operation-registration unit by using the server address.

12. A device for multicast-session management provided in a network including one or more servers and a plurality of clients, comprising:

a data-exchange interface which receives an original data flow from a server, and multicasts a multicast data flow to the network;

a usable-multicast-address-registration unit which stores therein usable multicast addresses;

a destination-address-conversion unit which converts a destination address of the original data flow into a multicast address, the multicast address being selected from the usable multicast addresses stored in said usable-multicast-address-registration unit, wherein said data-exchange interface multicasts the original data flow having the multicast address as the multicast data flow; and wherein said data-exchange interface transmits first control data to the network, and receives second control data from the network, the first control data indicating a status of use of the multicast address and the second control data indicating a status of use of another multicast address used by another device for multicast-session management provided in the network, wherein the multicast addresses stored in said usable-multicast-address-registration unit are updated according to the status of use of said another multicast address; and further comprising a source-address-check unit which detects a source address of a source of received data when the received data arrives at said data-exchange interface from the source, wherein the source address is utilized for determining whether the received data is the original data flow received from the server or the second control data received from said another device for multicast-session management.

13. The device as claimed in claim 12, wherein said data-exchange interface transmits the first control data by using a multicast address directed to all devices for session-management control provided in the network.

14. The device as claimed in claim 12, wherein said another multicast address is removed from said usable-multicast-address-registration unit when the second control data indicates a used status of said another multicast address, and is registered in said usable-multicast-address-registration unit when the second control data indicates an end-of-use status of said another multicast address.

15. The device as claimed in claim 14, further comprising a used-multicast-address-registration unit which stores therein used multicast addresses, wherein said another multicast address is registered in said used-multicast-address-registration unit when the second control data indicates a used status of said another multicast address, and is removed from said used-multicast-address-registration unit when the second control data indicates an end-of-use status of said another multicast address.

16. The device as claimed in claim 12, wherein said data-exchange interface includes:

a first interface which receives the original data flow, and multicasts the multicast data flow, and has a first address assigned thereto for receiving data from the network; and a second interface which is dedicated for transmission of the first control data and receipt of the second control data, and has a second address assigned thereto for receiving the second control data from the network.

* * * * *